US007343018B2

(12) United States Patent
van der Werff

(10) Patent No.: US 7,343,018 B2
(45) Date of Patent: Mar. 11, 2008

(54) SYSTEM OF SOUND TRANSDUCERS WITH CONTROLLABLE DIRECTIONAL PROPERTIES

(75) Inventor: Johan van der Werff, Nijmegen (NL)

(73) Assignee: PCI Corporation, Charlestown (KN)

( * ) Notice: Subject to any disclaimer, the term of this patent is extended or adjusted under 35 U.S.C. 154(b) by 1098 days.

(21) Appl. No.: 10/363,839

(22) PCT Filed: Sep. 12, 2001

(86) PCT No.: PCT/NL01/00671

§ 371 (c)(1),
(2), (4) Date: Aug. 6, 2003

(87) PCT Pub. No.: WO02/23945

PCT Pub. Date: Mar. 21, 2002

(65) Prior Publication Data

US 2004/0028238 A1 Feb. 12, 2004

(30) Foreign Application Priority Data

Sep. 13, 2000 (NL) .................................... 1016172

(51) Int. Cl.
*H04B 3/00* (2006.01)
*H04R 27/00* (2006.01)

(52) U.S. Cl. .......................... 381/80; 381/82; 381/335; 181/144

(58) Field of Classification Search .................. 381/80, 381/82, 85, 300, 332, 335, 89, 116, 182, 186, 381/387; 181/144
See application file for complete search history.

(56) References Cited

U.S. PATENT DOCUMENTS

| | | | | |
|---|---|---|---|---|
| 3,308,237 | A | 3/1967 | Novak | 179/1 |
| 4,472,834 | A | 9/1984 | Yamamuro et al. | 381/61 |
| 4,618,967 | A * | 10/1986 | Steinke et al. | 381/82 |
| 4,940,108 | A * | 7/1990 | Selby | 181/145 |
| 5,233,664 | A * | 8/1993 | Yanagawa et al. | 381/89 |
| 5,717,766 | A * | 2/1998 | Azoulay et al. | 381/300 |
| 5,802,190 | A * | 9/1998 | Ferren | 381/182 |
| 6,834,113 | B1 * | 12/2004 | Liljehag et al. | 381/99 |

FOREIGN PATENT DOCUMENTS

EP 0 034 844 9/1981

OTHER PUBLICATIONS

Philips Export BV, "Bessel Arrays", Elektor Electronics, London, GB, Jul./Aug. 1989, No. 169, pp. 14-15.

D. Keele, Jr., "Effective Performance of Bessel Arrays", J. Audio Eng. Soc., vol. 38, No. 10, Oct. 1990, pp. 723-748.

* cited by examiner

*Primary Examiner*—Xu Mei
(74) *Attorney, Agent, or Firm*—Michaelson & Associates; Peter L. Michaelson

(57) ABSTRACT

The invention relates to loudspeaker systems or loudspeaker columns as used in public address systems and at (pop) concerts. Such systems heretofore possess a frequency-dependent coverage angle and strong second and third order side lobes. The invention describes formulae of the voltage to be applied to the separate loudspeakers of the loudspeaker column, which makes it possible to realize the constant coverage angle over the entire frequency range and to suppress the side lobes to a far-reaching extent.

10 Claims, 4 Drawing Sheets

SYSTEM OF SOUND TRANSDUCERS WITH CONTROLLABLE DIRECTIONAL PROPERTIES

The invention relates to a system of sound transducers, in particular loudspeakers, comprising n loudspeakers (n=2 . . . x) which are arranged according to a regular pattern along one line in a column-shaped housing, wherein the sound transducers are each provided with an associated filter, which filters all receive an audio signal at an input thereof and deliver a signal at an output thereof to the associated sound transducer, in order that the sound transducers in operation possess a signal pattern with a predetermined characteristic.

Although the invention relates to sound transducers, that is, loudspeakers and microphones, hereinafter reference will be made to loudspeakers for the sake of a clear understanding of the invention.

Such loudspeaker systems in column form are used especially in public address systems, at (pop) concerts and the like and have as an advantage that through the use of a large number of parallel-connected loudspeakers a very high power can be delivered, so that with a single system a large space can be covered.

A drawback of such loudspeaker columns is that, viewed in vertical direction, they are highly direction-sensitive.

Figure 1:
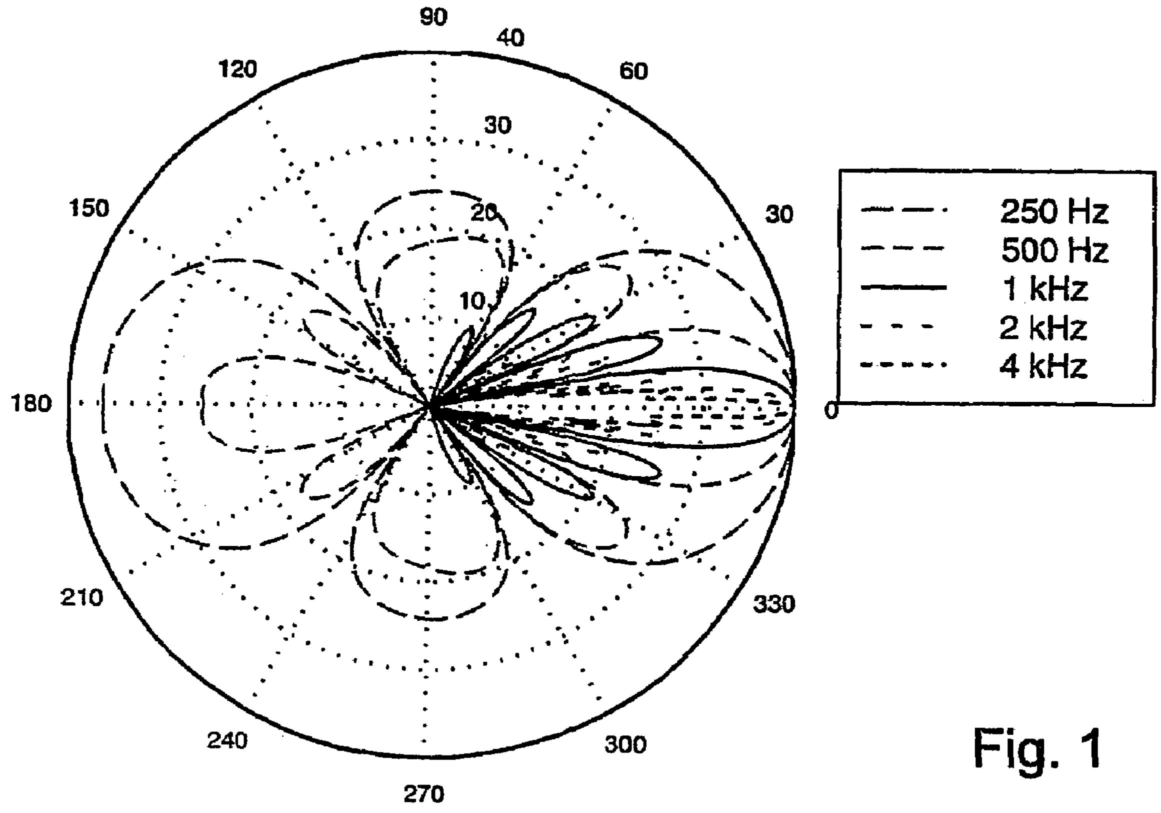

FIG. 1 shows the directional properties of a conventional loudspeaker column, from which it appears that for high frequencies the coverage angle is small and for lower frequencies the coverage angle is large, while further the side lobes on opposite sides of the main lobe are well visible. The first order side lobes in the example shown have, with respect to the main lobe, a level of about −13 dB, the second order side lobes have a level of about −18 dB and the third order side lobes have a level of about −21 dB, etc.

The varying coverage angle and the side lobes are in many cases undesirable, because they can have a highly adverse influence on the sound quality of the system in general and intelligibility in particular. Especially in spaces where strongly reflective surfaces are present and where, depending on the circumstances, a large or a small number of persons can be present, it is hardly possible, due to the varying coverage angle and the side lobes, to obtain a satisfactory sound pattern. For a detailed discussion of the above-outlined problems, reference is made to "Design and Implementation of a Sound Column with Exceptional Properties" by J. van der Werff, $96^{th}$ AES Convention, 26 Feb.-1 Mar. 1994, Amsterdam.

The above article includes a description of a loudspeaker column by the name of "constant λ column", which for all frequencies has the same coverage angle and the same level of side lobes. This is achieved by a high-off filtering of the signal applied to the loudspeakers, in such a manner that according as a loudspeaker is located farther from the acoustic middle of the column, filtering starts at a lower frequency.

Figure 2:
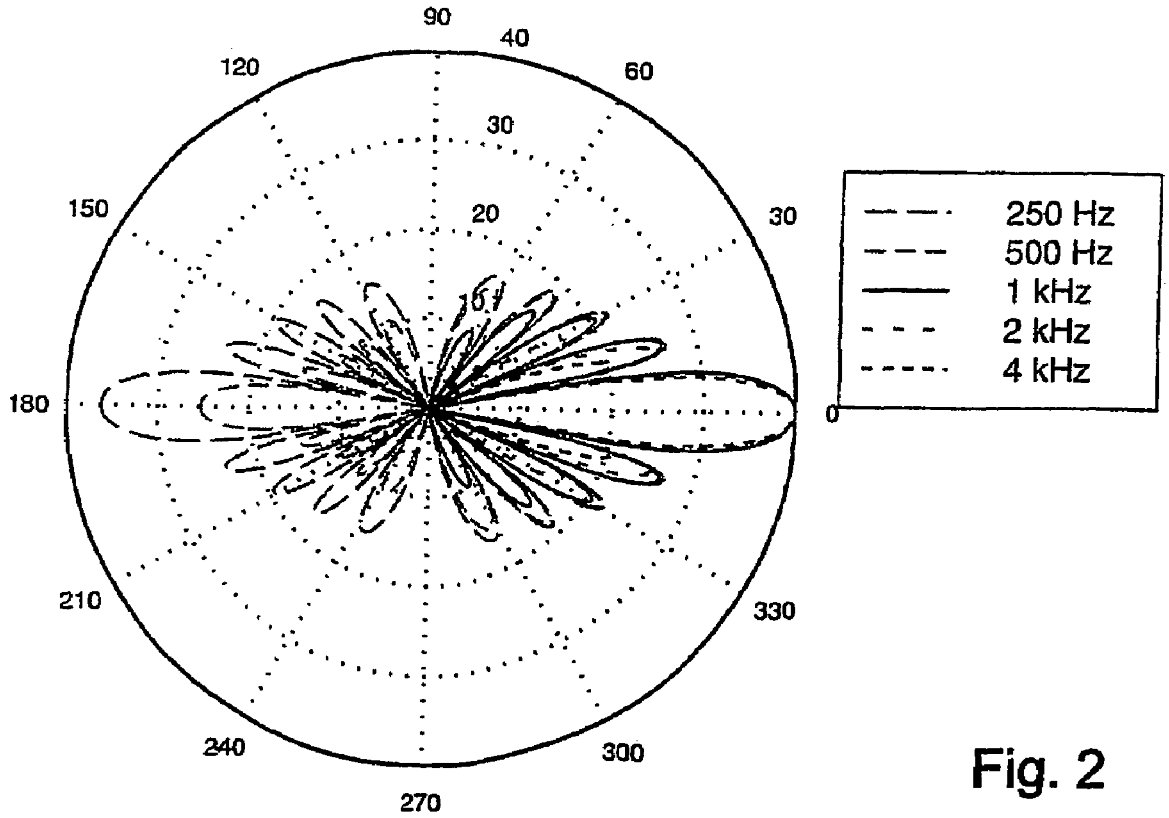

FIG. 2 shows the directional properties of such a constant λ column. This figure shows, however, that although the characteristic has been improved with respect to that of FIG. 1, the side lobes still remain present.

The invention contemplates providing a loudspeaker system, and more generally a system of sound transducers, that enables the side lobes to be suppressed essentially completely or at least to a desired very low level, while the constant coverage angle is maintained for all relevant audio frequencies.

The invention further contemplates providing a system of the above-mentioned type that enables broadening of the main lobe.

Finally, the invention contemplates providing a system of the above-mentioned kind that enables the so-called grating lobes to be eliminated, or at least to be suppressed to a far-reaching extent.

To that end, the invention provides a system of sound transducers of the above-mentioned kind, characterized in that means are provided for applying to each loudspeaker n in the column a voltage $V_n$, defined as:

$$V_n = V \cdot e^{-0,5\left(\frac{\alpha \cdot dls_n}{|dls_{\max}|}\right)^2} \tag{1}$$

wherein:

$V_n$: the voltage on the terminals of loudspeaker n;

V: the voltage on the terminals of the loudspeakers in the acoustic center of the column;

$dls_n$: the distance in meters of loudspeaker n to the acoustic center of the column;

$dls_{max}$: the distance in meters to the acoustic center of the loudspeaker farthest removed therefrom;

α: parameter depending on coverage angle, frequency and array dimension according to the relation:

$$\alpha = \beta \cdot f \cdot \frac{l_{array}}{k}$$

wherein:

β: the vertical coverage angle in degrees, which is fixedly chosen for a particular design;

f: the frequency in Hz;

$l_{array}$: the length of the array in meters;

k: constant=$14.10^3$ given the units mentioned for β, f and $l_{array}$.

According to the invention, it has surprisingly been found that if the power applied to the loudspeaker in the column satisfies the above relation, the side lobes are completely eliminated and the coverage angle is constant.

Figure 3:
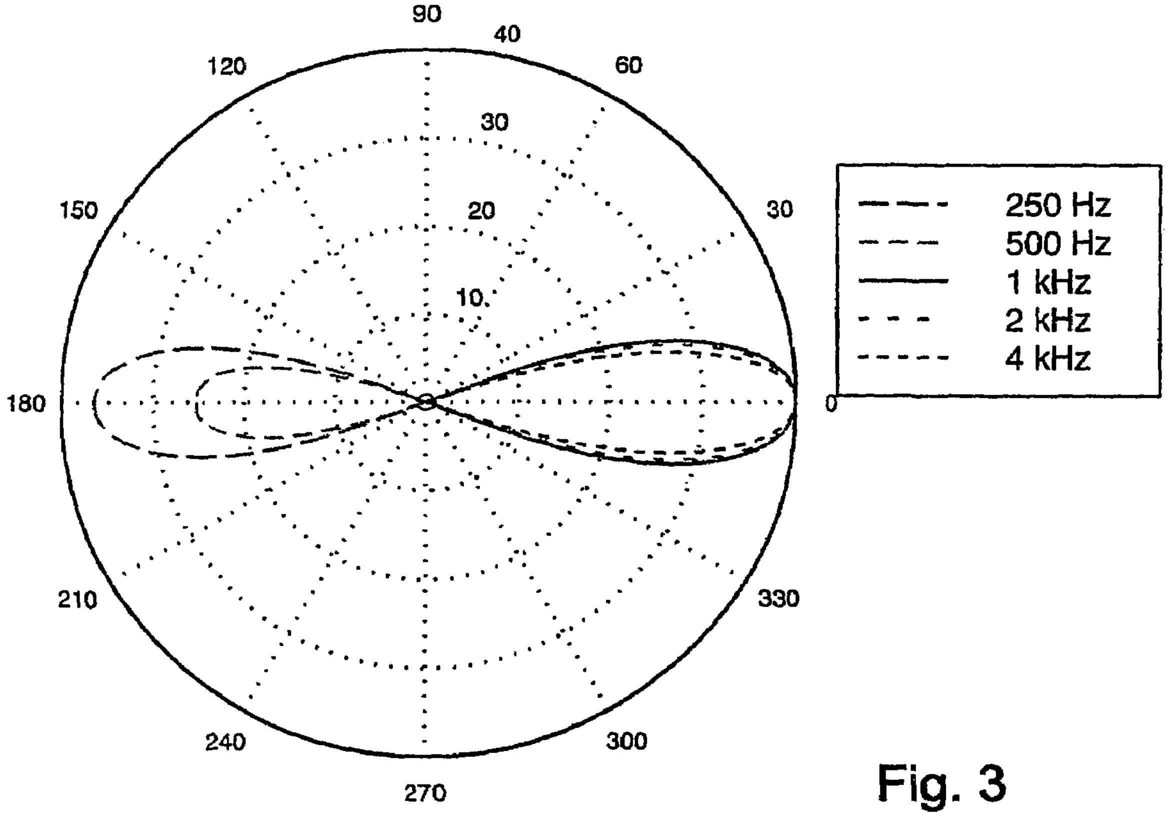

FIG. 3 shows the directional diagram of a loudspeaker column constructed according to the principle of the invention, from which this is clearly apparent.

In the Example according to FIG. 3, the starting point has been a column with 43 loudspeakers and a diameter of 13.5 cm, with the acoustic center located in the longitudinal middle of the column, a so-called symmetrical array. However, the principle of the invention is also straightforwardly applicable in arrays with an asymmetrically situated acoustic center.

In particular cases, in view of the acoustic requirements, it may be desired that a loudspeaker array still possess side lobes of a limited intensity. In such a case, the voltage applied to a loudspeaker in an array can be determined by a curve which is related to the formula of the cosine windows:

$$V = a - b.\cos(m) + c.\cos(2.m) \tag{2}$$

wherein:

a, b and c are the constants which define the window, such as:

Hanning: a=0.5; b=0.5; c=0

Hamming: a=0.54; b=0.46; c=0

Blackman: a=0.42; b=0.5; c=0.08 m: $m^{th}$ fraction of unit circle (in radials) according to:

$$m = \frac{0, 1, 2 \ldots (n-1)}{(nls-1)} \cdot 2\pi$$

wherein:

nls: operative number of loudspeakers in the array, depending on coverage angle and frequency according to the relation below:

$$nls = \frac{k}{\varphi \cdot f \cdot c \cdot d}$$

wherein:

ϕ: desired coverage angle in degrees f: frequency in Hz c: sound velocity (ca. 340 m/sec in air)

d: center-to-center distance between the transducers in meters k: constant to some extent depending on window type:

Hanning: $11.5.10^6$ (side lobe suppression ca. 30 dB)

Hamming: $11.5.10^6$ (side lobe suppression ca. 40 dB)

Blackman: $15.10^6$ (side lobe suppression ca. 60 dB)

With all these windows, side lobe suppressions can be realized which are mostly sufficient for practical applications.

Figure 4A:
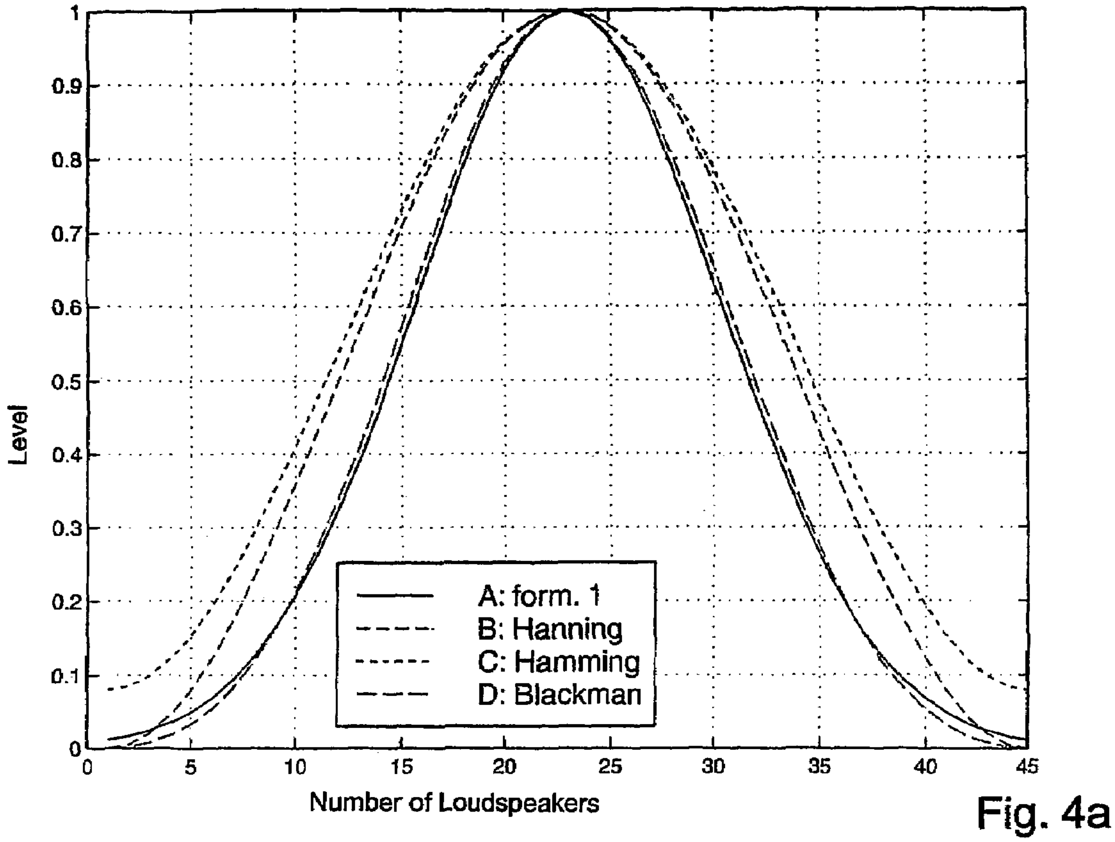
Figure 4B:
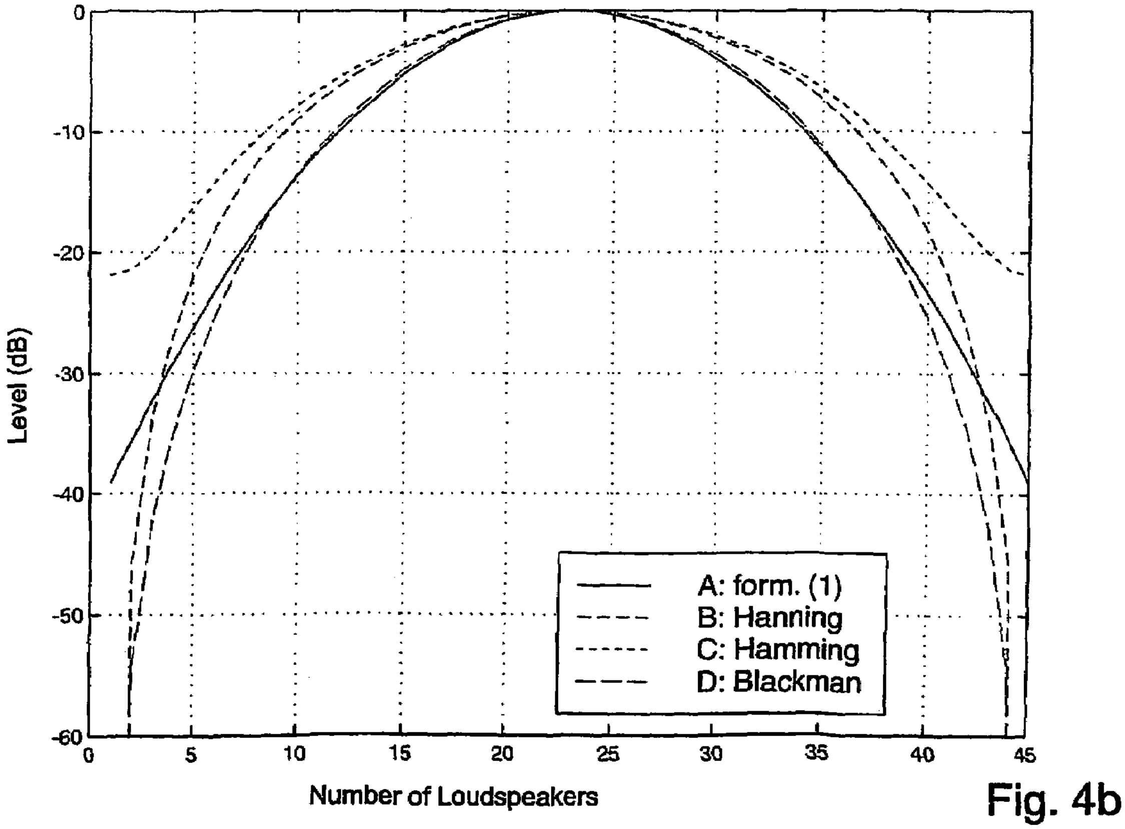

FIGS. 4*a* and *b* show a curve A according to formula (1) and curve B, C and D according to formula (2), wherein curve B is the Hanning curve, curve C is the Hamming curve and curve D is the Blackman curve. The vertical axis in FIG. 4*b* plots the voltage in dB; the horizontal axis plots the loudspeakers n with n=0-45 in the example. Loudspeaker No. 23 constitutes the acoustic center for the column.

By deviating from the ideal curve, in principle infinitely many possible curves can be realized.

Figure 5:
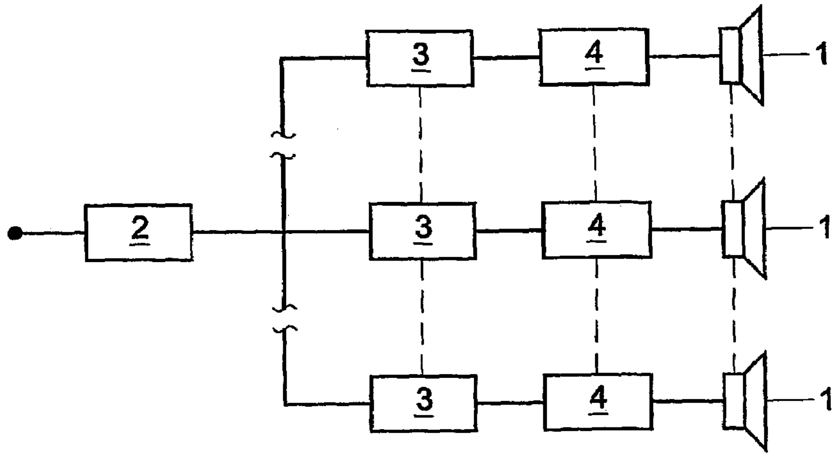

FIG. 5 schematically shows a loudspeaker system according to the invention, provided with a number of loudspeakers 1, to which the output signal of an amplifier 2 is applied. Between the output of the amplifier and the loudspeakers, a series connection of adjustable attenuators 3 and adjustable low-pass filters 4 is included. The attenuators are set in accordance with formula (1) and the low-pass filters according to the principle of the constant λ column.

Formula (1) can also be used with advantage to give various loudspeakers in a column a time weighing. With a time weighing, the directional characteristic of a column, and in particular the width of the main lobe, can be influenced.

Formula (1) written for the time delay of the signal applied to loudspeaker n in a column is as follows:

$$t_n = \max t \cdot e^{-0.5\left(\frac{\alpha \cdot dls_n}{|dls_{\max}|}\right)^2} \quad (3)$$

wherein:

$t_n$: the delay time of transducer n maxt: the maximum time difference between the transducers (depending on frequency, extent of broadening)

$dls_n$: the distance of loudspeaker n to the acoustic center;

$dls_{max}$: the distance of the loudspeaker farthest removed from the acoustic center;

α: parameter which fits the effect sought, normally ca. 3.

With formula (3), optionally, also, the main lobe can be split into two main lobes, which make an equal angle with the main axis. This is especially useful in, for instance, stadiums, for irradiating two rows of grandstands. The time weighing can be applied independently of, but also in combination with, the level weighing according to formula (1).

Grating lobes result from discontinuity between transducers within an array. Each practical array consists of a finite number of transducers having a certain directional effect. When the directional effect of the individual transducers is smaller than critical, grating lobes arise. These grating lobes can be prevented by choosing the directional effect not lower than according to the relation below:

$$P_{f,\varphi} = P_{f,0} \cdot e^{-0,5\left(\frac{\alpha \cdot \varphi}{2 \cdot \pi}\right)^2}$$

wherein:

P: the sound pressure in Pascal (at frequency and angle with main axis).

ϕ: the angle (in radials between −π and π) with respect to the main axis of the transducer, in the direction of the array (0 is the main axis)

f: the frequency at which the directional effect is determined

α: parameter depending on frequency and transducer dimension according to the relation below:

$$\alpha = \frac{f \cdot d}{k}$$

wherein:

d: the center-to-center distance between the transducers k: a constant. Optimally, it is 18; practical values are between 18 and ca. 25.

This relation describes the polar radiation and sensitivity, respectively, of the transducer in the array. This polar behavior can be realized in the conventional ways.

Figure 6:
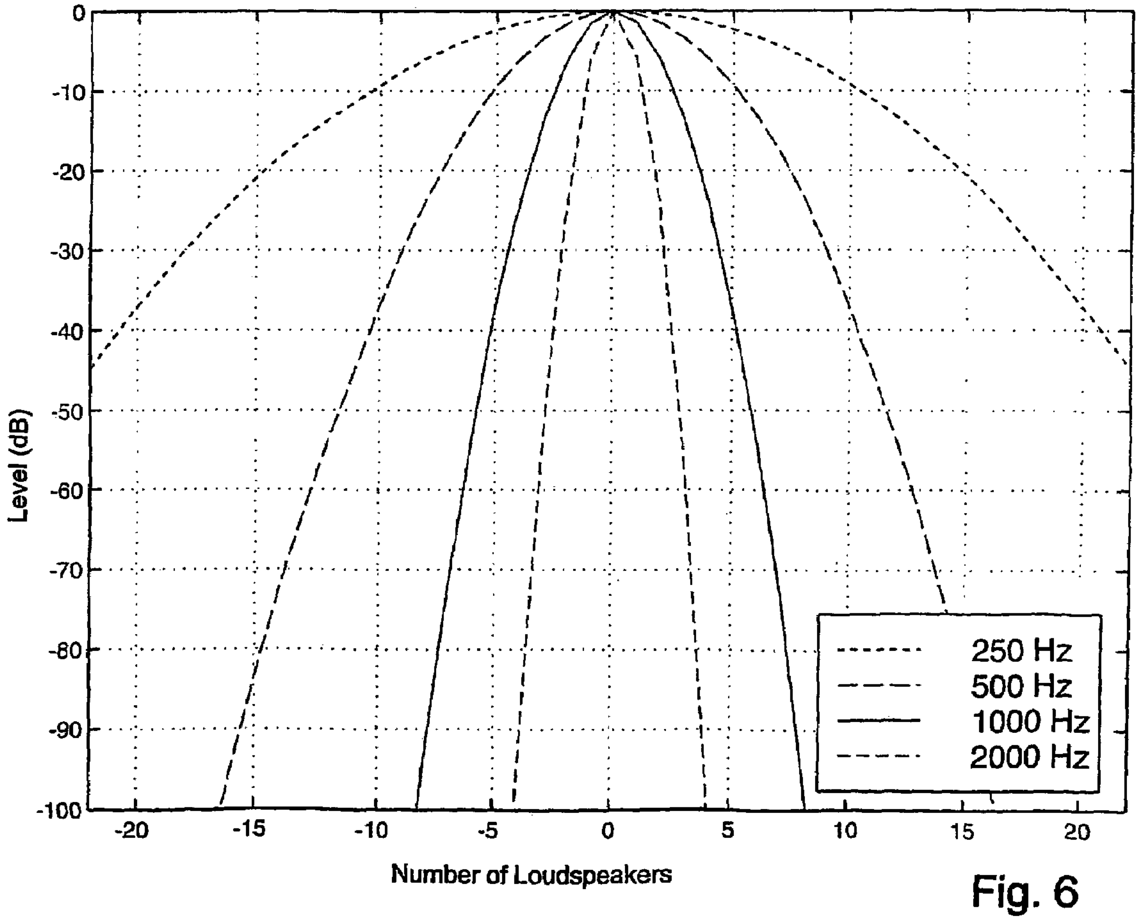

FIG. 6 shows typical curves at frequencies of 250 Hz-5 KHz at K=18 and d=13.5 cm.

The invention claimed is:

1. A system of sound transducers, in particular loudspeakers, comprising n loudspeakers (n=2 . . . x) which are arranged according to a regular pattern substantially along one line in a column-shaped housing, wherein the sound transducers are each provided with an associated filter, which filters all receive an audio signal at an input thereof and deliver a signal at an output thereof to the associated sound transducer, in order that the sound transducers in operation possess a signal pattern with a predetermined characteristic, characterized in that means are provided for applying to each loudspeaker n in the column a voltage $V_n$, according to:

$$V_n = V \cdot e^{-0,5\left(\frac{\alpha \cdot dls_n}{|dls_{max}|}\right)^2}$$

wherein:

$V_n$: the voltage on the terminals of loudspeaker n;

V: the voltage on the terminals of the loudspeakers in the acoustic center of the column;

$dls_n$: the distance in meters of loudspeaker n to the acoustic center of the column;

$dls_{max}$: the distance in meters to the acoustic center of the loudspeaker farthest removed therefrom;

α: parameter depending on coverage angle, frequency and array dimension according to the relation:

$$\alpha = \beta \cdot f \cdot \frac{l_{array}}{k}$$

wherein:

β: the vertical coverage angle in degrees, which is fixedly chosen for a particular design;

f: the frequency in Hz;

$l_{array}$: the length of the array in meters;

k: constant=$14.10^3$ given the units mentioned for β, f and $l_{array}$.

2. A system of sound transducers, in particular loudspeakers, comprising n loudspeakers (n=2 . . . x) which are arranged according to a regular pattern substantially along one line in a column-shaped housing, wherein the sound transducers are each provided with an associated filter, which filters all receive an audio signal at an input thereof and deliver a signal at an output thereof to the associated sound transducer, in order that the sound transducers in operation possess a signal pattern with a predetermined characteristic, characterized in that means are provided for applying to each loudspeaker n in the column a voltage $V_n$, according to:

$$V=a-b\cdot\cos(m)+c\cdot\cos(2.m) \qquad (2)$$

wherein:

a, b and c are the constants which determine the window, m: is $m^{th}$ fraction of unit circle (in radials) according to:

$$m = \frac{0, 1, 2 \ldots (n-1)}{(nls-1)} \cdot 2\pi$$

wherein:

nls: operative number of loudspeakers in the array, depending on coverage angle and frequency according to the relation below:

$$nls = \frac{k}{\varphi \cdot f \cdot c \cdot d}$$

wherein:

φ: desired coverage angle in degrees f: frequency in Hz c: sound velocity (ca. 340 m/sec in air)

d: center-to-center distance between the transducers in meters k: constant to some extent-depending on window type.

3. A system according to claim 2, wherein a=0.5, b=0.5 and c=0.

4. A system according to claim 2, wherein a=0.54, b=0.46 and c=0.

5. A system according to claim 2, wherein a=0.42, b=0.5 and c=0.08.

6. A system of sound transducers, in particular loudspeakers, comprising n loudspeakers (n=2 . . . x) which are arranged according to a regular pattern substantially along one line in a column-shaped housing, wherein the sound transducers are each provided with an associated filter, which filters all receive an audio signal at an input thereof and deliver a signal at an output thereof to the associated sound transducer, in order that the sound transducers in operation possess a signal pattern with a predetermined characteristic, characterized in that means are provided for delaying in time the signal that is applied to a loudspeaker n in the column, according to the formula $$t_n = \text{max}t \cdot e^{-0.5\left(\frac{\alpha \cdot dls_n}{|dls_{max}|}\right)^2}$$

wherein:

$t_n$: the delay time of transducer n maxt: the maximum time difference between the transducers (depending on frequency, extent of broadening)

$dls_n$: the distance of loudspeaker n to the acoustic center;

$dls_{max}$: the distance of the loudspeaker farthest removed from the acoustic center;

α: parameter which fits the effect sought, normally ca. 3.

7. A system according to claim 6, wherein α=33.

8. A system of sound transducers, in particular loudspeakers, comprising n loudspeakers (n=2 . . . x) which are arranged according to a regular pattern substantially along one line in a column-shaped housing, wherein the sound transducers are each provided with an associated filter, which filters all receive an audio signal at an input thereof and deliver a signal at an output thereof to the associated sound transducer, in order that the sound transducers in operation possess a signal pattern with a predetermined characteristic, characterized in that means are provided for applying to each loudspeaker n in the column a power $P_f$ according to:

$$P_{f,\varphi} = P_{f,0} \cdot e^{-0,5\left(\frac{\alpha \cdot \varphi}{2\pi}\right)^2}$$

wherein:

P: the sound pressure in Pascal (at frequency and angle with main axis)

φ: the angle (in radials between −π and π) with respect to the main axis of the transducer, in the direction of the array (0 is the main axis)

f: the frequency at which the directional effect is determined

α: parameter depending on frequency and transducer dimension according to the relation below:

$$\alpha = \frac{f \cdot d}{k}$$

wherein:

d: the center-to-center distance between the transducers k: a constant.

9. A system according to claim 8, characterized in that the value of k is between 18 and 25.

10. A system according to claim 9, characterized in that k=18.

* * * * *